United States Patent
Carpenedo (10) Patent No.: US 11,744,181 B2
(45) Date of Patent: Sep. 5, 2023

(54) FEEDERHOUSE ASSEMBLIES HAVING BIASED LOCK PINS, AGRICULTURAL HARVESTERS, AND RELATED METHODS

(71) Applicant: AGCO do Brasil Soluções Agrícolas Ltda., Ribeirao Preto (BR)

(72) Inventor: Marcelo Carpenedo, Sapucaia do Sul (BR)

(73) Assignee: AGCO do Brasil Soluções Agrícolas Ltda., Ribeirao Preto (BR)

( * ) Notice: Subject to any disclaimer, the term of this patent is extended or adjusted under 35 U.S.C. 154(b) by 0 days.

(21) Appl. No.: 17/754,252

(22) PCT Filed: Jun. 17, 2020

(86) PCT No.: PCT/IB2020/055637
§ 371 (c)(1),
(2) Date: Mar. 28, 2022

(87) PCT Pub. No.: WO2021/059029
PCT Pub. Date: Apr. 1, 2021

(65) Prior Publication Data
US 2022/0338414 A1    Oct. 27, 2022

(30) Foreign Application Priority Data

Sep. 27, 2019  (GB) ........................... 1913928

(51) Int. Cl.
*A01D 41/16*       (2006.01)
*A01D 41/06*       (2006.01)

(52) U.S. Cl.
CPC ............ *A01D 41/16* (2013.01); *A01D 41/06* (2013.01)

(58) Field of Classification Search
CPC ......... A01D 41/16; A01D 41/14; A01D 41/06
See application file for complete search history.

(56) References Cited

U.S. PATENT DOCUMENTS 3,442,069 A * 5/1969 Ashton ................. A01D 41/16
                                                            56/2
3,559,384 A   2/1971 Bernhardt et al.
(Continued)

FOREIGN PATENT DOCUMENTS

BE         1008757 A6 *  8/1996  ............ A01D 41/16
CN         205266258 U   6/2016
(Continued)

OTHER PUBLICATIONS

UK Intellectual Property Office, Search report for related UK Application No. GB1913928.6, dated Mar. 19, 2020.
(Continued)

*Primary Examiner* — Thomas B Will
*Assistant Examiner* — Joan D Misa (57) ABSTRACT

A feederhouse assembly for an agricultural harvester includes a frame, a header lock pin, a biasing member coupled to the frame and the header lock pin, and a latch coupled to the frame and the header lock pin. The biasing member is configured to urge the header lock pin outward to lock a harvesting header to the frame. A rotatable latch in a first positron protrudes from the frame and retains the header lock pin in an inward positron. The latch in a second position permits the header lock pin to travel outward. A method includes applying a force from a harvesting header on a latch protruding from a frame of a feederhouse, pushing the latch to release a header lock pin from an inward position, and urging the header lock pin outward to lock the harvesting header to the frame.

10 Claims, 6 Drawing Sheets

(56) References Cited

U.S. PATENT DOCUMENTS

| | | | |
|---|---|---|---|
| 4,253,295 A | 3/1981 | Knepper | |
| 5,464,371 A | 11/1995 | Honey | |
| 6,519,923 B1 | 2/2003 | Cooksey et al. | |
| 6,735,929 B2 | 5/2004 | Watts et al. | |
| 7,497,459 B2 | 3/2009 | Johnson et al. | |
| 7,650,736 B1 | 1/2010 | Salley et al. | |
| 9,723,785 B2 | 8/2017 | Ritter | |
| 10,681,866 B2 * | 6/2020 | Solimar Walter | E02F 3/3636 |
| 11,172,614 B2 * | 11/2021 | Noll | A01B 59/062 |
| 2003/0172637 A1 | 9/2003 | Watts et al. | |
| 2008/0205978 A1 | 8/2008 | Johnson et al. | |
| 2016/0057930 A1 | 3/2016 | Ritter | |
| 2016/0360698 A1 | 12/2016 | Ducroquet et al. | |
| 2018/0007832 A1 | 1/2018 | Matousek et al. | |
| 2018/0255707 A1 | 9/2018 | Solimar | |

FOREIGN PATENT DOCUMENTS

| | | | | |
|---|---|---|---|---|
| DE | 10 2013 110688 B4 | 5/2019 | | |
| EP | 685146 A1 * | 12/1995 | | A01D 41/16 |
| EP | 1 964 462 A1 | 9/2008 | | |
| WO | 2015/134055 A1 | 9/2015 | | |

OTHER PUBLICATIONS

European Patent Office, International Search Report for Related International Patent Application No. PCT/IB2020/055637, dated Oct. 2, 2020.

* cited by examiner

FIG. 6

FEEDERHOUSE ASSEMBLIES HAVING BIASED LOCK PINS, AGRICULTURAL HARVESTERS, AND RELATED METHODS

CROSS-REFERENCE TO RELATED APPLICATION

This application claims the benefit of the filing date of U.K. Patent Application GB 1913928.6, "Feederhouse Assemblies Having Biased Lock Pins, Agricultural Harvesters, and Related Methods," filed Sep. 27, 2019, the entire disclosure of which is incorporated herein by reference.

FIELD

This disclosure relates to self-propelled crop-harvesting machines that can carry a header supported on the front end thereof, and particularly to header attachment mechanisms and methods.

BACKGROUND

Self-propelled agricultural harvesters are well known and include, by way of example, combine harvesters, windrowers and forage harvesters, all of which typically include a frame or chassis, an operator cab, an engine, and ground-engaging wheels or tracks. A cutting or pick-up header is often carried by the harvester, the header typically being considerably wider than the harvester and mounted to the front side of a feederhouse.

Crop material collected by the header is conveyed into the feederhouse before being conveyed in a generally rearward direction to crop processing apparatus. In the case of a combine harvester, the processing apparatus serves to thresh the crop material and separate grain therefrom, whereas, in the case of a forage harvester or windrower the crop material is typically passed through conditioning rollers.

The header is typically separable from the agricultural harvester, and may be connected by latches, hooks, or other means, Connecting and disconnecting the header can be difficult and dangerous because of the size and weight of the header and the agricultural harvester, and because the operations typically occur in the field. Thus, an operational error can lead to injury or death, particularly if an operator is near the connection point.

BRIEF SUMMARY

In some embodiinents, a feederhouse assembly for an agricultural harvester includes a feederhouse having an inlet end, a frame adjacent the inlet end of the feederhouse, a header lock pin extending from the frame, a biasing inember coupled to the frame and the header lock pin, and a rotatable latch coupled to the frame and the header lock pin. The frame defines a generally planar face configured to receive a harvesting header. The biasing member is configured to urge the header lock pin outward to lock the harvesting header to the frame. The latch in a first position at least partially protrudes from the frame and retains the header lock pin in an inward position. The latch in a second position permits the header lock pin to travel outward urged by the biasing member.

A method includes moving an agricultural harvester toward a harvesting header, appiying a force from the harvesting header on a latch at least partially protruding from a frame of a feederhouse carried by the agricultural harvester, pushing the latch to release a header lock pin from an inward position, and urging the header lock pin outward to cock the harvesting header to the frame.

An agricultural harvester includes a chassis, a feederhouse mounted to the chassis and having an inlet end, a frame adjacent the inlet end, a header lock pin extending from the frame, a biasing member coupled to the frame and the header lock pin, a rotatable latch coupled to the frame and the header lock pin, a processing system carried by the chassis and structured to receive crop material from the feederhouse, and a grain bin carried by the chassis and structured to receive grain from the processing system. The frame defines a generally planar face configured to receive a harvesting header. The biasing member is configured to urge the header lock pin outward to lock the harvesting header to the frame. The latch in a first position at least partially protrudes from the frame and retains the header lock pin in an inward position. The latch in a second position permits the header lock pin to travel outward urged by the biasing member.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

The illustrations presented herein are not actual views of any agricultural harvester or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items, As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures, Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances, By way of example, depending on the particular parameter, property, or condition that is substantially met, the parameter, property, or condition may be at least 90.0% met, at least 95.0% met, at least 99.0% met, or even at least 99.9% met, As used herein, the term "about" used in reference to a given parameter is inclusive of the stated value and has the meaning dictated by the context (e.g., it includes the degree of error associated with measurement of the given parameter).

Figure 1:
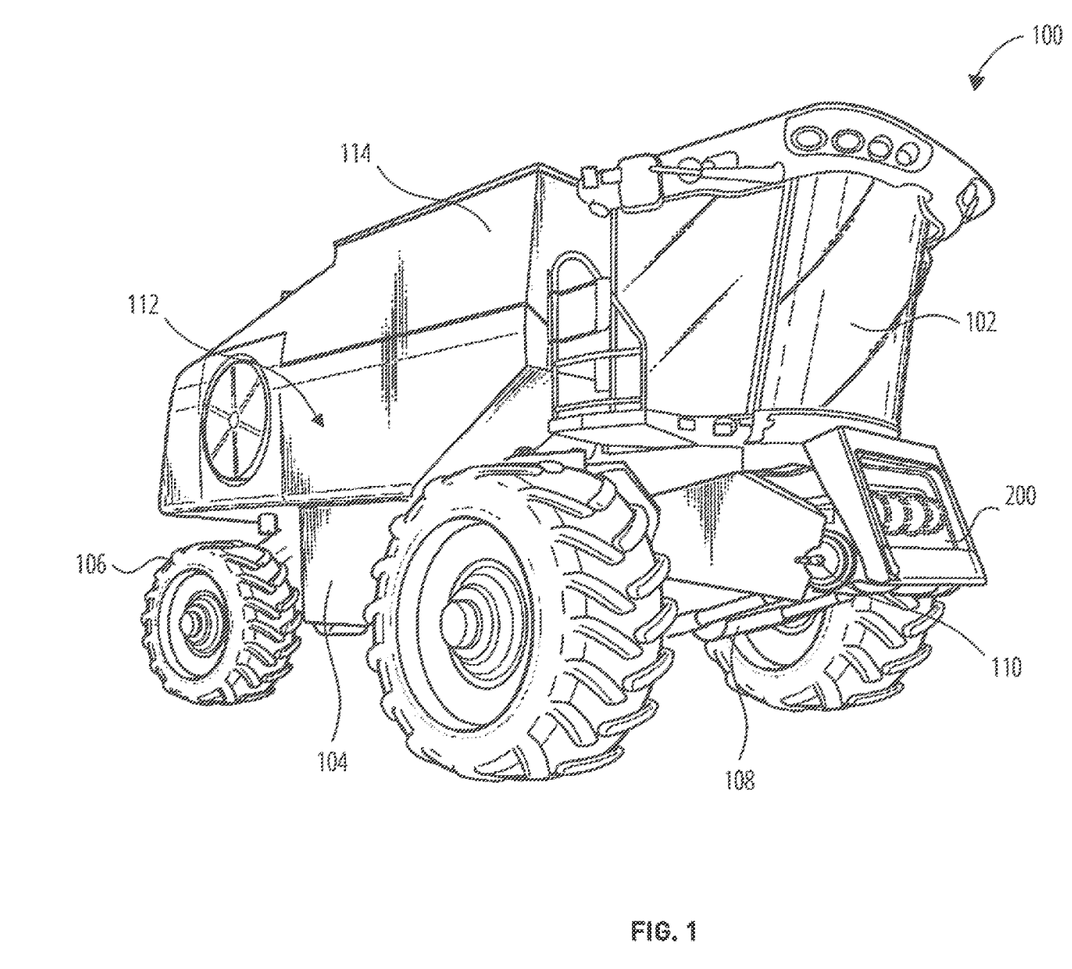
FIG. 1 is a simplified front perspective view of an example agricultural harvester.

FIG. 1 illustrates an example agricultural harvester embodied as a combine harvester 100. In the context of the present disclosure, the example combine harvester 100 is merely illustrative, and other machines and/or implements with like functionality may deploy certain embodiments disclosed herein, such as windrowers or forage harvesters, without limitation. The example combine harvester 100 is shown in FIG. 1 WithMit a header attached, and includes a feederhouse assembly 200 carried by a chassis 104 supported by wheels 106. An operator cab 102 is mounted to the chassis 104. In some embodiments, other or additional forms of travel may be used, such as tracks. Hydraulic cylinders 108 are shown affixed to the underside of the feederhouse assembly 200 on one end and to the chassis 104 on the other end. The feederhouse assembly 200 may move (e.g., up and down, tilt) based on actuation of the hydraulic cylinders 108, which causes a detachably coupled header to also be raised, lowered, and/or tilted. A rotating shaft 110 may be configured to provide mechanical power to a header during operation of the combine harvester 100. The rotating shaft 110 may be configured to operate at various speeds, as described in, for example, U.S. Pat. No. 9,434,252, "Power Takeoff Drive System for a Vehicle," issued Sep. 6, 2016.

In general, the combine harvester 100 cuts crop materials (e.g., using the header), wherein the cut crop materials are delivered to the from end of the feederhouse assembly 200. Such crop materials are moved upwardly and rearwardly within and beyond the feederhouse assembly 200 (e.g., by a conveyer) until reaching a processing system 112 comprising a thresher rotor. In one embodiment, the thresher rotor may comprise a single, transverse rotor, such as that found in a Gleaner® Super Series Combine by AGCO. Other designs may be used, such as axial-based, twin rotor, or hybrid designs. The thresher rotor processes the crop materials in known manner and passes a portion of the crop material (e.g., heavier chaff or corn stalks, without limitation) toward the rear of the combine harvester 100 and another portion (e.g., grain and possibly light chaff) through a cleaning process. In the processing system 112, the crop materials undergo threshing and separating operations in other words, the crop materials are threshed and separated by the thresher rotor operating in cooperation with well-known foraminous processing members in the form of threshing concave assemblies and separator grate assemblies, with the grain (and possibly light chaff) escaping through the concave assemblies and the grate assemblies and to a cleaning system located beneath the processor to facilitate the cleaning of the heavier crop material. Bulkier stalk and leaf materials are generally retained by the concave assemblies and the grate assemblies and are discharged out from the processing system 112 and ultimately out of the rear of the combine harvester 100. The cleaned grain that drops to the bottom of the cleaning system is delivered by a conveying mechanism that transports the grain to an elevator, which conveys the grain to a grain bin 114 located at the top of the combine harvester 100. Any remaining chaff and partially or unthreshed grain is recirculated through the processing system 112 via a tailings return conveying mechanism, Because combine processing is known to those having ordinary skill in the art, further discussion thereof is omitted here for brevity. In embodiments in which the agricultural harvester is a windrower or forage harvester, the processing system 112 may include conditioning rollers, rather than separation devices.

Figure 2:
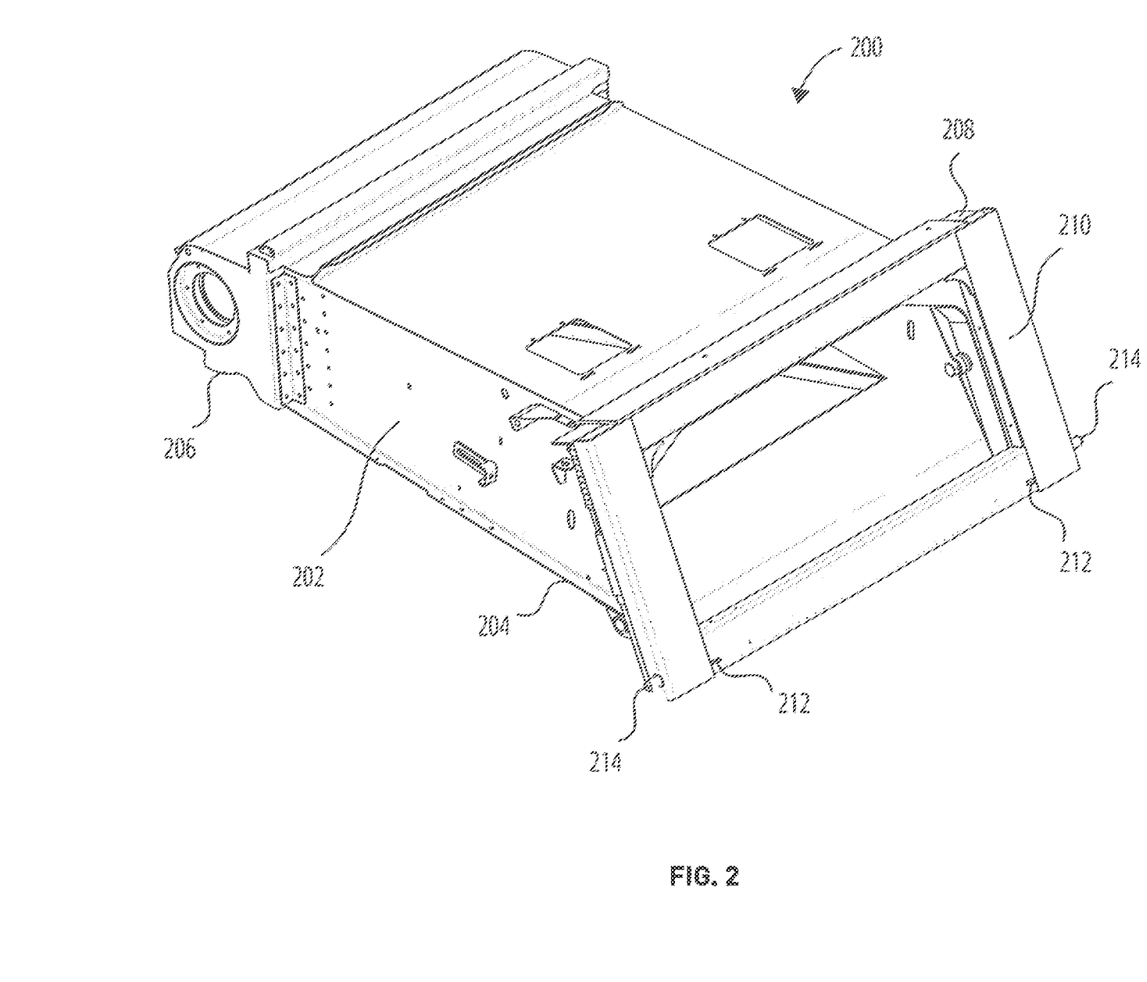
FIG. 2 illustrates a feederhouse assembly, which may be a part of the agricultural harvester shown in FIG. 1.

FIG. 2 is a simplified view of the feederhouse assembly 200 shown in FIG. 1. As shown, a feederhouse 202 has an inlet end 204 and an outlet end 206. Crop material entering the feederhouse assembly 200 from the harvesting header travels from the inlet end 204 toward the outlet end 206 on the way to the processing system 112 (FIG. 1). The harvesting header is coupled to the feederhouse 202 by a frame 208, which is adjustable to control the orientation of the harvesting header with respect to the combine harvester 100. Control of the harvesting header is important to enable an operator to properly harvest crops. Adjustment of the frame 208 also facilitates connecting and disconnecting the harvesting header because the frame 208 can be positioned to match the orientation of the harvesting header, The frame 208 may define a generally planar face 210 configured to receive a harvesting header. One or more rotatable latches 212 (two are depicted in FIG. 2) may protrude from the face 210 when no harvesting header is attached to the frame 208. The latches 212 may be coupled to header lock pins 214 extending from the frame 208. As shown, the header lock pins 214 may extend from opposite sides of the frame 208. The header lock pins 214 may be configured to extend outward from the frame 208 and lock a harvesting header to the frame 208.

Figure 3:
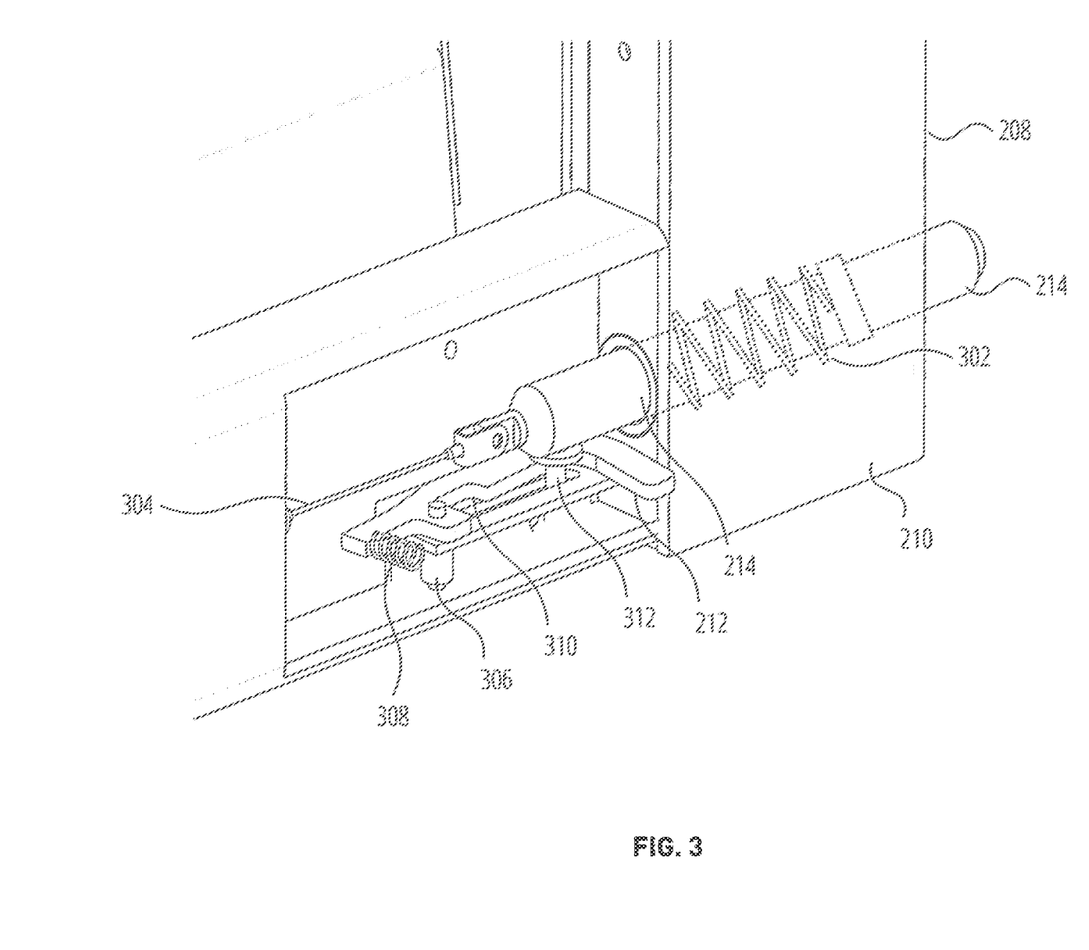
FIG. 3 is a simplified detail view of a frame of the feederhouse assembly shown in FIG. 2.

FIG. 3 is a simplified detail view of the frame 208 shown in FIG. 2, with portions of the face 210 removed for illustrative purposes. A biasing member 302 (shown behind the face 210 in dashed lines) is coupled to the frame 208 and the header lock pin 214 and is configured to urge the header lock pin 214 outward (i.e., to the right, in the orientation shown in FIG. 3) to lock a harvesting header to the frame 208. The biasing member 302 is depicted as a compression coil spring, but may be any selected device to push the header lock pin 214 outward (eq., an extension spring or an air spring, without limitation). A cable 304 is also coupled to the header lock pin 214, so that a tensile force on the cable 304 pulls the header lock pin 214 inward. The cable 304 may be coupled to a handle, an actuator, or other device to apply the tensile force to the header lock pin 214. In certain embodiments, the cable 304 may be replaced with a bar or other linking mechanism.

The latch 212 is rotationally secured to the frame 208 at a pivot pin 306, and a portion of the latch 212 is urged outward from the face 210 of the frame 20$ by another biasing member 308.

Figure 4:
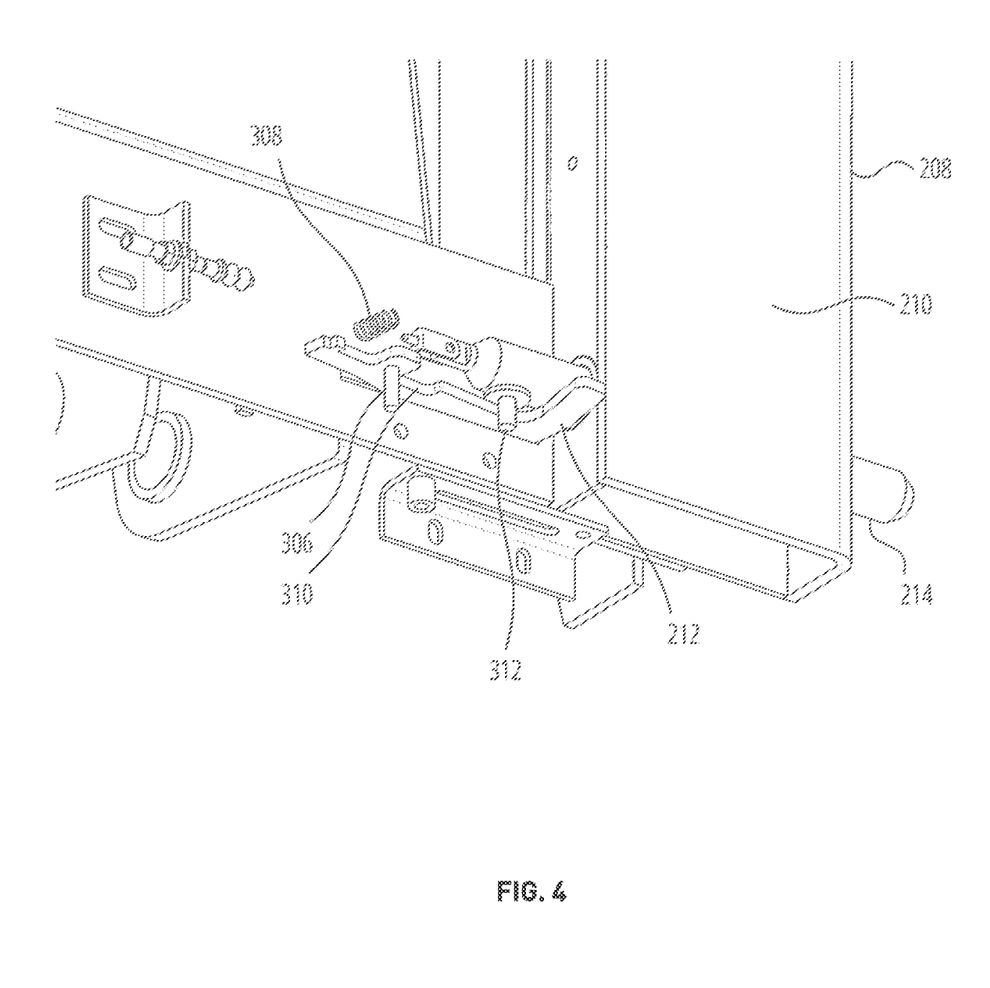
FIG. 4 is an exploded view of a latch of the feederhouse assembly shown in FIG. 2.
Figure 5:
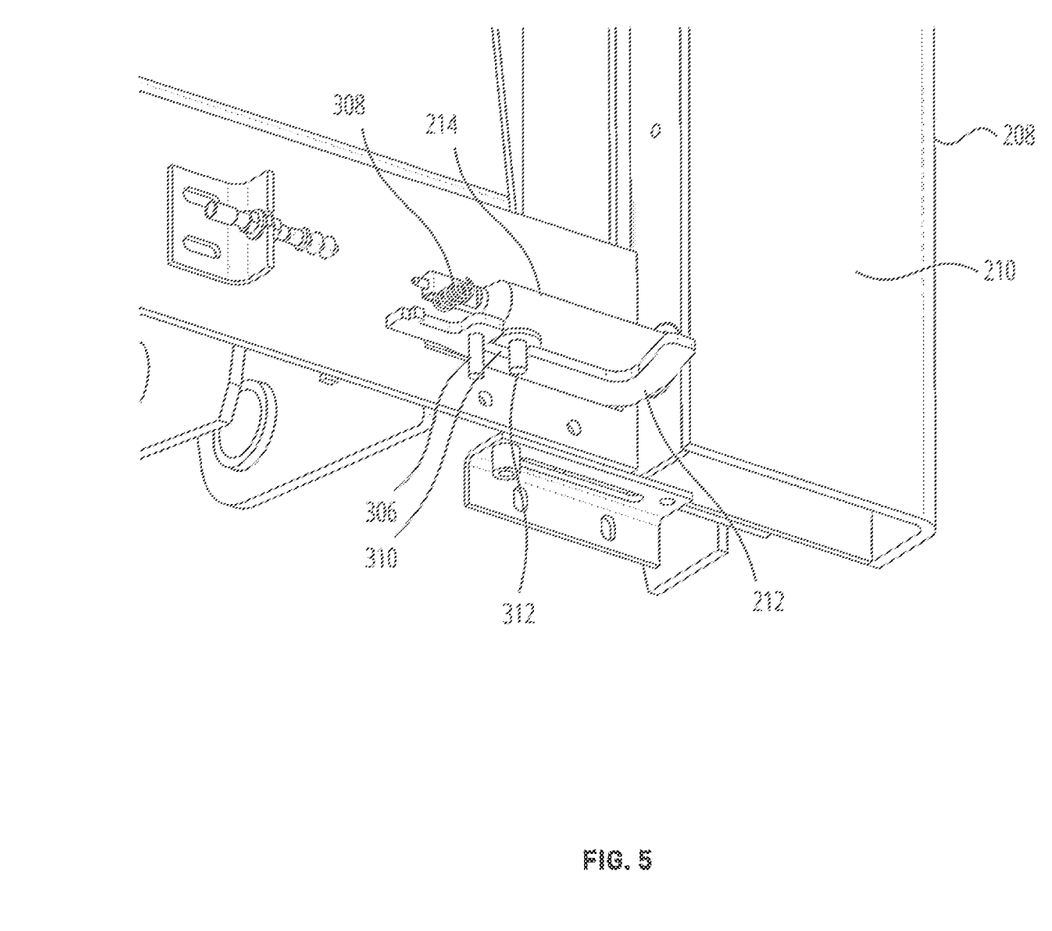
FIG. 5 is an exploded view of the latch shown in FIG. 4 in another position.

FIG. 4 is an exploded view showing the latch 212 and the header lock pin 214. FIG. 5 shows the latch 212 and the header lock pin 214 in another position. The latch 212 defines a locking indent 310, and the header lock pin 214 has a protrusion 312 extending from the header lock pin 214. The protrusion 312 may rest in the locking indent 310 when the header lock pin 214 is pulled inward, as shown in FIG. 5. The latch 212 may therefore hold the header lock pin 214 in the inward position. Because an end of the latch 212 extends past the face 210 of the frame 208, the latch 212 may be moved to the position shown in FIG. 4 upon contact with an object, such as a harvesting header. The latch 212 may then release the header lock pin 214, which, urged by the biasing member 302, may spring outward, locking the harvesting header in place.

In the position shown in FIG. 5, a portion of the latch 212 protrudes from the face 210 of the frame 208. In the position shown M FIG. 4, the latch 212 may be flush with the face 210 of the frame 208.

Figure 6:
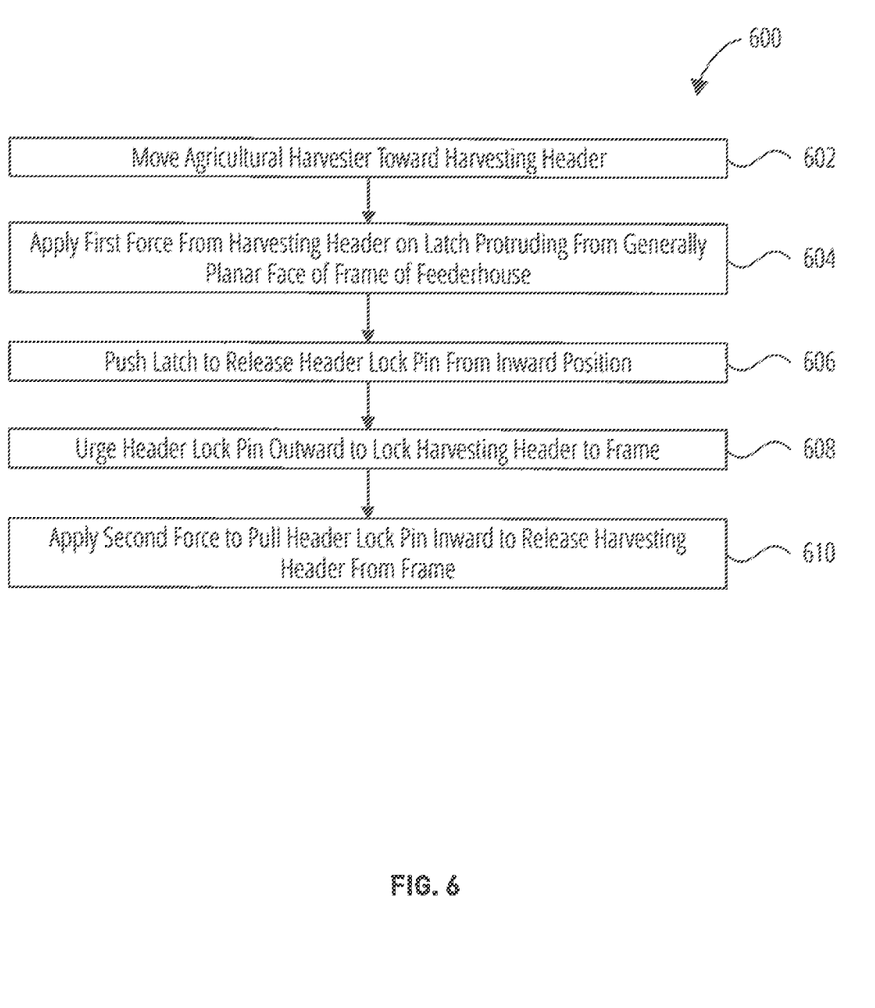
FIG. 6 is a simplified flow chart illustrating an example method of connecting and disconnecting a harvesting header.

FIG. 6 is a simplified flow chart illustrating a method 600 of connecting a harvesting header to an agricultural harvester and disconnecting the harvesting header from the agricultural harvester, such as the combine harvester 100 shown in FIG. 1 and having a feederhouse assembly 200 as shown in FIG. 2. As shown in block 602 of FIG. 6, the agricultural harvester moves toward the harvesting header.

In block 604, a first force is applied from the harvesting header on a latch at least partially protruding from a generally planar face of a frame of a feederhouse carried by the agricultural harvester.

In block 606, the latch is pushed to release a header lock pin from an inward position, In block 608, the header lock pin is urged outward to lock the harvesting header to the frame. Urging the header lock pin outward secures the harvesting header to the frame without intervention by any person located proximal to the coupling location so long as the harvesting header and the frame are properly aligned. To secure the harvesting header, the header lock pin may be extended into a hole defined in a frame of the harvesting header. Block 604, block 606, and block 608 may typically occur at the same time as part of a single motion of the agricultural harvester toward the harvesting header.

In block 610, a second force is applied to pull the header lock pin inward to release the harvesting header from the frame. The second force is typically a tensile force on the cable 304 shown in FIG. 3. The second force is applied to overcome an outward force of a spring on the header lock pin. As a result of pulling the header lock pin inward, the header lock pin may be secured in an inward position to the latch. The agricultural harvester then backs away from the harvesting header, disconnected from the harvesting header.

Advantages of including a header lock pin in the feederhouse assembly disclosed herein is that the harvesting header may be automatically connected to the agricultural harvester without intervention by any person located proximal to the coupling location. This may increase safety by enabling the operator to remain away from pinch points. The disconnection of the harvesting header may be automatic (e.g., by using an actuator controlled by a controller in the operator cab) or may be manual (e.g., an operator may pull on a handle connected to the cable 304).

Additional non-limiting example embodiments of the disclosure are described below.

Embodiment 1: A feederhouse assembly for an agricultural harvester comprising a feederhouse comprising an inlet end, a frame adjacent the inlet end of the feederhouse, a header lock pin extending from the frame, a biasing member coupled to the frame and the header lock pin, and a rotatable latch coupled to the frame and the header lock pin. The frame defines a generally planar face configured to receive a harvesting header. The biasing member is configured to urge the header lock pin outward to lock the harvesting header to the frame. The latch in a first position at least partially protrudes from the frame and retains the header lock pin in an inward position. The latch in a second position permits the header lock pin to travel outward urged by the biasing member.

Embodiment 2: The feederhouse assembly of Embodiment 1, wherein the biasing member comprises a spring, Embodiment 3: The feederhouse assembly of Embodiment 1 or Embodiment 2, further comprising a cable coupled to the header lock pin, wherein a tensile force on the cable pulls the header lock pin inward.

Embodiment 4: The feederhouse assembly of any one of Embodiment 1 through Embodiment 3, wherein in the second position, the latch is flush with the generally planar face of the frame.

Embodiment 5: The feederhouse assembly of any one of Embodiment 1 through Embodiment 4, wherein the latch further comprises another biasing member configured to urge the latch toward the first position.

Embodiment 6: The feederhouse assembly of any one of Embodiment 1 through Embodiment 5, wherein the latch pivots about a pivot pin.

Embodiment 7: The feederhouse assembly of any one of Embodiment 1 through Embodiment 6, wherein the latch defines a locking indent, wherein the header lock pin has a protrusion, and wherein in the second position of the latch, the protrusion is disposed within the locking indent.

Embodiment 8: The feederhouse assembly of any one of claim 1 through claim 3, wherein the latch in the first position protrudes from generally planar face of the frame.

Embodiment 9: The feederhouse assembly of claim 8, wherein the harvesting header pushes the latch in to the second position.

Embodiment 10: An agricultural harvester comprising a chassis, the feederhouse of any one of Embodiment 1 through claim 9 mounted to the chassis, a processing system carried by the chassis and structured to receive crop material from the feederhouse, and a grain bin carried by the chassis and structured to receive grain from the processing system, Embodiment 11: A method comprising moving an agricultural harvester toward a harvesting header, applying a force from the harvesting header on a latch at least partially protruding from a frame of a feederhouse carried by the agricultural harvester, pushing the latch to release a header lock pin from an inward position, and urging the header lock pin outward to lock the harvesting header to the frame.

Embodiment 12: The method of Embodiment 11, further comprising applying a second force to pull the header lock pin inward to release the harvesting header from the frame, Embodiment 13: The method of Embodiment 12, wherein applying the second force to pull the header lock pin inward comprises securing the header lock pin in an inward position to the latch.

Embodiment 14: The method of Embodiment 12 or Embodiment 13, wherein applying a second force from the harvesting header on the latch comprises overcoming a force of a spring on the header lock pin.

Embodiment 15: The method of any one of Embodiment 11 through Embodiment 14, wherein urging the header lock pin outward to lock the harvesting header to the frame comprises securing the harvesting header to the frame without intervention by any person located proximal to a coupling location.

Embodiment 16: The method of any one of Embodiment 11 through Embodiment 15, wherein urging the header lock pin outward to lock the harvesting header to the frame comprises extending the header lock pin into a hole defined in a frame of the harvesting header.

Embodiment 17: The method of any one of Embodiment 11 through Embodiment 16, wherein applying a three from the harvesting header on a latch comprises applying a force from the harvesting header on a latch at least partially protruding from a generally planar face of the frame of the feederhouse.

Embodiment 18: An agricultural harvester comprising a chassis, a feederhouse mounted to the chassis and comprising an inlet end, a frame adjacent the inlet end, a header lock pin extending from the frame, a biasing member coupled to the frame and the header lock pin, a rotatable latch coupled to the frame and the header lock pin, a processing system carried by the chassis and structured to receive crop material from the feederhouse; and a grain bin carried by the chassis and structured to receive grain from the processing system. The frame defines a generally planar face configured to receive a harvesting header. The biasing member is configured to urge the header lock pin outward to lock the harvesting header to the frame. The latch in a first position at least partially protrudes from the frame and retains the header lock pin in an inward position. The latch in a second position permits the header lock pin to travel outward urged by the biasing member.

AH references cited herein are incorporated herein in their entireties. If there is a conflict between definitions herein and in an incorporated reference, the definition herein shall contra.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A feederhouse assembly for an agricultural harvester, the feederhouse assembly comprising:
a feederhouse comprising an inlet end;
a frame adjacent the inlet end of the feederhouse, the frame defining a generally planar face configured to receive a harvesting header;
a header lock pin extending from the frame;
a biasing member coupled to the frame and the header lock pin, the biasing member configured to urge the header lock pin outward to lock the harvesting header to the frame; and
a rotatable latch coupled to the frame and the header lock pin, wherein the latch in a first position at least partially protrudes from the frame and retains the header lock pin in an inward position, and wherein the latch in a second position permits the header lock pin to travel outward urged by the biasing member.

2. The feederhouse assembly of claim 1, wherein the biasing member comprises a spring.

3. The feederhouse assembly of claim 1, further comprising a cable coupled to the header lock pin, wherein a tensile force on the cable pulls the header lock pin inward.

4. The feederhouse assembly of claim 1, wherein in the second position, the latch is flush with the generally planar face of the frame.

5. The feederhouse assembly of claim 1, wherein the latch further comprises another biasing member configured to urge the latch toward the first position.

6. The feederhouse assembly of claim 1, wherein the latch pivots about a pivot pin.

7. The feederhouse assembly of claim 1, wherein the latch defines a locking indent, wherein the header lock pin has a protrusion, and wherein in the second position of the latch, the protrusion is disposed within the locking indent.

8. The feederhouse assembly of claim 1, wherein the latch in the first position protrudes from generally planar face of the frame.

9. The feederhouse assembly of claim 8, wherein the harvesting header pushes the latch in to the second position.

10. An agricultural harvester, comprising:
a chassis;
the feederhouse of claim 1 mounted to the chassis;
a processing system carried by the chassis and structured to receive crop material from the feederhouse; and
a grain bin carried by the chassis and structured to receive grain from the processing system.

* * * * *